United States Patent
Gentilcore et al.

(10) Patent No.: US 12,039,153 B2
(45) Date of Patent: Jul. 16, 2024

(54) COMPOSITION OF A USER INTERFACE THROUGH DATA BINDING

(71) Applicant: GOOGLE LLC, Mountain View, CA (US)

(72) Inventors: Anthony Gentilcore, San Francisco, CA (US); Steffen Meschkat, Menlo Park, CA (US); Kishore Simbili, Sunnyvale, CA (US); Etienne Membrives, Paris (FR)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/351,971

(22) Filed: Jun. 18, 2021

(65) Prior Publication Data

US 2021/0311615 A1    Oct. 7, 2021

Related U.S. Application Data

(63) Continuation of application No. 15/145,009, filed on May 3, 2016, now abandoned.

(51) Int. Cl.
*G06F 3/04842* (2022.01)
*G06F 3/0481* (2022.01)
*G06F 9/451* (2018.01)

(52) U.S. Cl.
CPC ........ *G06F 3/04842* (2013.01); *G06F 3/0481* (2013.01); *G06F 9/451* (2018.02)

(58) Field of Classification Search
CPC ..... G06F 3/04842; G06F 3/0481; G06F 9/451
See application file for complete search history.

(56) References Cited

U.S. PATENT DOCUMENTS

| | | | |
|---|---|---|---|
| 7,293,275 B1* | 11/2007 | Krieger | H04N 21/4316 725/40 |
| 9,608,870 B1* | 3/2017 | Hendriks | G06F 3/0484 |
| 9,984,132 B2* | 5/2018 | Nelson | G06F 3/04817 |
| 10,068,295 B1* | 9/2018 | Allen | G06Q 40/08 |
| 10,650,067 B2* | 5/2020 | Desineni | G06F 16/9535 |
| 10,691,473 B2* | 6/2020 | Karashchuk | H04W 4/12 |

(Continued)

OTHER PUBLICATIONS

International Search Report and Written Opinion for PCT Application No. PCT/US2016/069125 dated Apr. 7, 2017. 12 pages.

(Continued)

*Primary Examiner* — Haimei Jiang
(74) *Attorney, Agent, or Firm* — Gray Ice Higdon

(57) ABSTRACT

The technology relates to integrating applications into a single user interface. One or more computing devices may display a user interface including associated data corresponding to a first application and generate a request for supplemental data. A second application which can satisfy the request for supplemental data may be identified by the one or more computing devices, and the one or more computing devices may generate and display a notification indicating that the second application can provide the requested supplemental data. A selection of the notification may be received by the one or more computing devices and a second user interface corresponding to the second application may be integrated into the user interface, wherein the second user interface displays the requested supplemental data.

16 Claims, 11 Drawing Sheets

(56) References Cited

U.S. PATENT DOCUMENTS

| | | | |
|---|---|---|---|
| 2002/0042920 A1* | 4/2002 | Thomas | H04N 21/4751 348/E7.071 |
| 2011/0047467 A1* | 2/2011 | Porter | H04L 41/22 715/734 |
| 2011/0271184 A1* | 11/2011 | SiMa | G06F 9/451 715/764 |
| 2012/0179955 A1* | 7/2012 | French | G06F 16/957 707/706 |
| 2013/0111328 A1* | 5/2013 | Khanna | G06F 16/972 715/234 |
| 2014/0181082 A1* | 6/2014 | Fries | G06F 16/9536 707/722 |
| 2014/0250147 A1* | 9/2014 | Shapira | G06Q 10/02 707/770 |
| 2015/0234930 A1* | 8/2015 | Lakkur | G06F 40/134 715/240 |
| 2016/0154544 A1* | 6/2016 | Van Os | G06F 3/04842 715/835 |
| 2017/0046437 A1* | 2/2017 | Desineni | G06F 30/20 |
| 2017/0185656 A1* | 6/2017 | Nelson | G06F 16/248 |
| 2017/0322704 A1* | 11/2017 | Gentilcore | G06F 3/04842 |

OTHER PUBLICATIONS

European Patent Office; Communication Pursuant to Article 94(3) EPC issued in Application No. 16828879.3; 5 pages; dated Oct. 1, 2021.

China National Intellectual Property Administration; Notification of the Second Office Action issued in Application No. 201680081800.8; 37 pages; dated Oct. 8, 2021.

China National Intellectual Property Administration; Decision of Rejection issued in Application No. 201680081800.8; 15 pages. dated Mar. 31, 2022.

European Patent Office: Summons to Attend Oral Proceedings Pursuant to Rule 115(1) issued for Application No. 16828879.3, 7 pages, dated Dec. 12, 2022.

European Patent Office; Brief Communication issued in Application No. 16828879.3; 2 pages; dated May 25, 2023.

* cited by examiner

330 — Dining Out: The Definitive Guide

340 —  100 Best Bay Area Restaurants

Circle Pizza

320 —

Trattoria Italiana

300

Circle Pizza

500

World's Best Pizza

Location
    Address Line 1: 1600 Amphitheatre Parkway
    City: Mountain View
    State: CA
    Zip: 64043

520

Hours of Operation
    M: 10:00 AM – 11:00 PM
    T: 10:00 AM – 11:00 PM
    W: 10:00 AM – 11:00 PM

530

300

COMPOSITION OF A USER INTERFACE THROUGH DATA BINDING

BACKGROUND

Computing devices, such as mobile devices, often lack the screen real-estate to display a sufficient amount of information to a user. Additionally, each application is typically capable of providing only a small a portion of the information which may be needed by the user. As such, the user may need to switch between multiple applications, or search for the needed information manually. As such, gathering and viewing all of the needed information may become cumbersome and time consuming.

SUMMARY

Embodiments within the disclosure relate generally to manufacturing structured forms. One aspect includes a method for integrating applications into a single user interface. One or more computing devices may display a user interface including associated data, corresponding to a first application. The one or more computing devices may generate a request for supplemental data and identify a second application which can satisfy the request for supplemental data. A notification indicating that the second application can provide the requested supplemental data may be generated and displayed by the one or more computing devices. The one or more computing devices may receive a selection of the notification and integrate a second user interface corresponding to the second application into the user interface, wherein the second user interface displays the requested supplemental data.

In some embodiments the one or more computing devices, a second request for supplemental data, identify a third application which can satisfy the second request for supplemental data, generate and display a second notification indicating that the third application can provide the second requested supplemental data and upon receiving a selection of the second notification, integrate a third user interface corresponding to the third application into the user interface, wherein the third user interface displays the second requested supplemental data.

In some embodiments the request for supplemental data is based upon the associated data displayed on the one or more computing devices.

In some embodiments the second request for supplemental data is based upon the requested supplemental data displayed in the second user interface.

In some embodiments the request for supplemental data includes a request for a specific type of data not available through the first application.

In some embodiments the second user interface may be updated when the associated data displayed on the user interface changes.

In some embodiments the second user interface may be removed when the associated data displayed on the user interface changes.

Another aspect includes a system for dispatching entered data. The system may comprise one or more computing devices having one or more processors and memory storing instructions. The instructions may be executable by the one or more processors and may comprise displaying a user interface including associated data, corresponding to a first application, generating a request for supplemental data, identifying a second application which can satisfy the request for supplemental data, generating and displaying a notification indicating that the second application can provide the requested supplemental data, receiving a selection of the notification, and integrating a second user interface corresponding to the second application into the user interface, wherein the second user interface displays the requested supplemental data.

Another aspect includes non-transitory computer-readable medium storing instructions. The instructions, which when executed by one or more processors, cause the one or more processors to display a user interface including associated data, corresponding to a first application, generate a request for supplemental data, identify a second application which can satisfy the request for supplemental data, generate and display a notification indicating that the second application can provide the requested supplemental data, receive a selection of the notification, integrate a second user interface corresponding to the second application into the user interface, wherein the second user interface displays the requested supplemental data.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Figure 1:
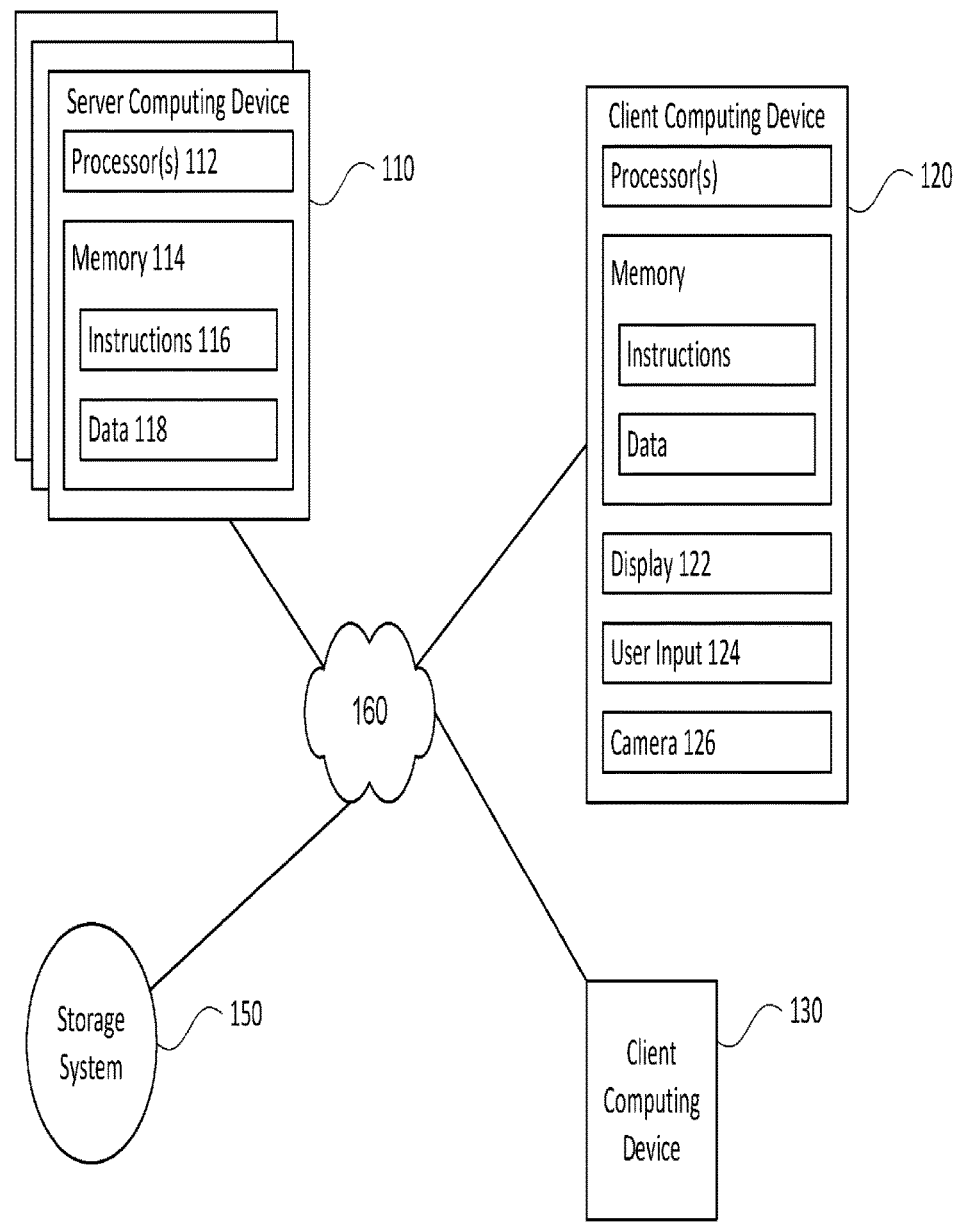
FIG. 1 is a functional diagram of an example system in accordance with aspects of the disclosure.

The technology relates to augmenting the display of an application on a computing device with data and user interfaces of other applications. In this regard, an application running on a device may anchor the user interfaces of other applications in its own user interface. For instance, a user may open an application and the display may be populated with the user interface of that application. While the application is displayed, a program operating on the computing device may determine that other applications are able to provide user interfaces and additional information which is not available from the application which is currently running on the device. The program may present an option for the user to allow the application to incorporate the user interfaces and additional information into the user interface of the application. Upon the user selecting the option to incorporate the other applications, the user may be provided with additional information and functions provided by the other applications and their respective user interfaces, while staying within the application.

In one embodiment, a computing device may load an application. The application may include display elements, such as a user interface, and associated data which is overlaid on the user interface. For example, the application may be a mobile application, such as a restaurant recommendation application. The restaurant recommendation application may include a user interface for displaying associated data, such as a list of popular restaurants.

The application may indicate that supplemental data may be added to the display and/or provided by the application. In this regard, based on the associated data that is being displayed in the user interface, the application may generate one or more declarations indicating that supplemental data may be accommodated and/or provided by the application. Such supplemental data may include calendar data, location data, address book data, contact data, mapping data, or any other data. Other applications may also generate declarations indicating the specific type of supplemental data which can be accommodated and provided.

Declarations may include data identifiers. The data identifiers may include input identifiers and/or output identifiers which indicate the specific type of supplemental data which can be accommodated and/or provided, respectively, by the application. The data identifiers may be named such that they include a description of the type of supplemental data each of the data identifiers are associated with, assuring compatibility between the application and other applications. For example, the names of the data identifiers may be based on descriptive terms such that, when any application generates declarations to provide and/or accommodate a specific type of supplemental data, the data identifier associated with these declarations would assure compatibility between the data being provided and/or accommodated.

Declarations may further include display identifiers. Display identifiers may indicate the types of user interfaces which can be accommodated and/or provided by the application. In this regard, the display identifiers may include display identifiers and compose identifiers which indicate the specific type of user interfaces which can be provided and accommodated, respectively.

A data management application may monitor the applications on the computing device to determine whether any of the one or more declarations may be satisfied. In this regard, the data management application may be integrated into an operating system executing on the computing device and may continually monitor the applications to determine whether any declarations have been generated.

Upon determining that one or more declarations have been generated, the data management application may extract the data and display identifiers associated with each declaration. Based on the extracted data and display identifiers, the data management application may query each of the other applications on the computing device to determine whether any of the other applications can satisfy the declarations with supplemental data of the specific type identified by the extracted identifiers.

Upon determining that at least one of the declarations is satisfied, one or more respective notifications indicating that matching supplemental data is available may be provided. In addition, the notifications may be presented in a space saving arrangement by compressing and placing them behind a first notification. Such an arrangement may allow for notifications to be presented without overtaking the display of the application.

Upon receiving a selection of one of the notifications, the data management application may integrate the user interface and supplemental data of the other application associated with the selected notification into the user interface of the application. For example, when the user selects the first notification, the reservation application may receive a request to provide the user interface and supplemental data associated with the reservation application declaration.

The data management may integrate the selected other application into the user interface by arranging the supplemental data and user interface provided by the other application into the application. The application may then integrate the user interface provided by the other application along with the corresponding supplemental data within its own user interface.

Additional declarations may be generated by other applications which are integrated into the user interface of the application. In this regard, the other applications may generate declarations for additional supplemental data based on the associated data and supplemental data displayed in the user interface.

The data management application may monitor the application and the other applications to determine whether any of the declarations for additional supplemental data may be satisfied, as previously described. In this regard, the data management application may query each of the other applications to determine whether they can provide additional supplemental data of the specific type of data specified in the one or more requests for additional supplemental data. The data management module may integrate the selected other application into the user interface by arranging the additional supplemental data and corresponding display elements in the location provided by the application.

The other applications integrated into the user interface may update their corresponding display elements and supplemental associated data based on the data being displayed in the user interface.

The features described herein may allow for user interfaces of multiple applications to be shown together, to provide a coherent and rich user experience. By displaying multiple user interfaces together in a single display, users are able to utilize multiple applications, and their corresponding data, at a single time without having to navigate between different screens. In addition the features described above may allow for the computing device to anticipate a user's needs, thereby providing information to the user before it is requested. Moreover, the multiple applications do not need to be programmed so that they are aware of each other. Rather the system may organize the cooperation of the multiple applications according to their respective user interfaces and data, thereby allowing for greater integration between applications.

Example Systems

Figure 2:
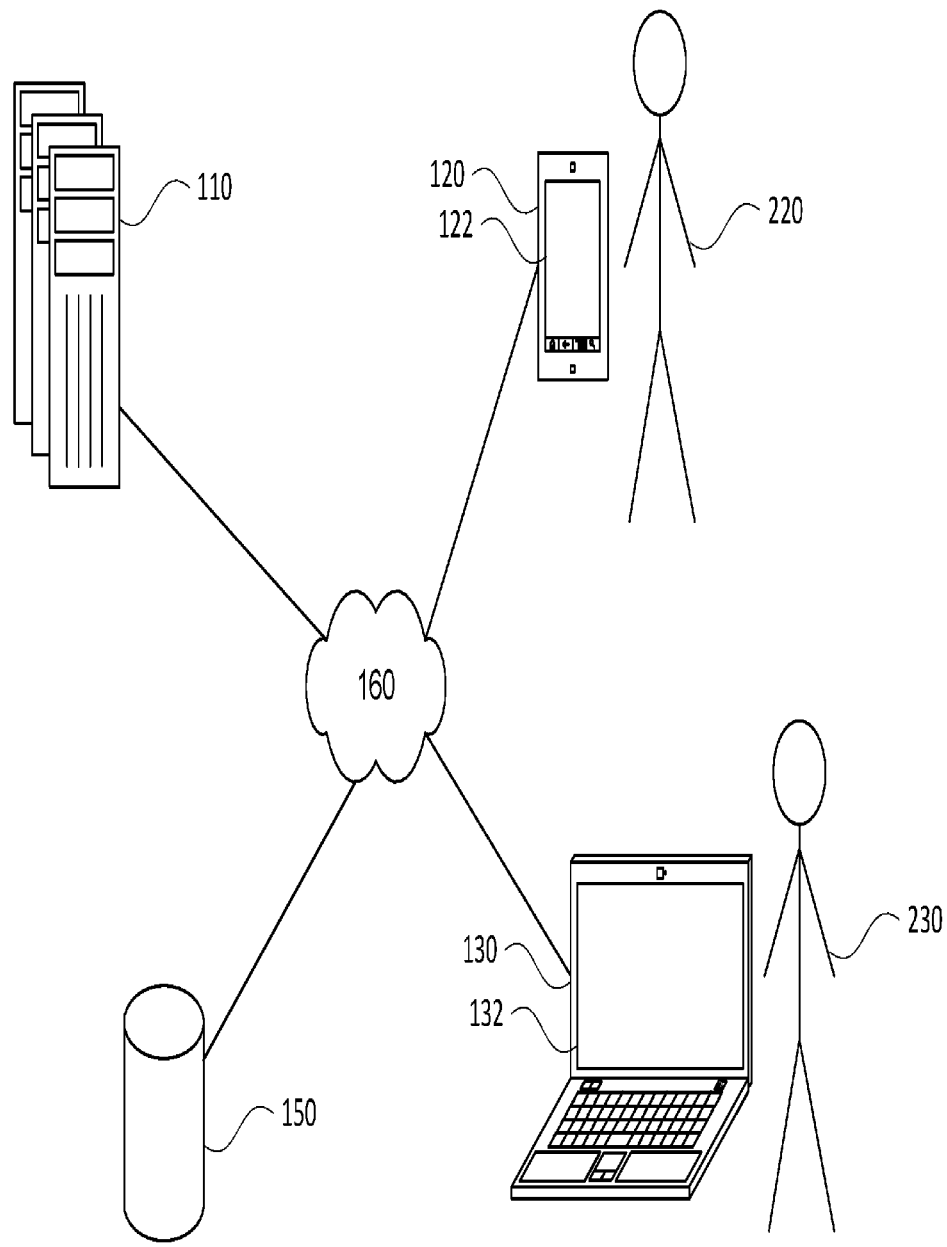
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, and 130 as well as storage system 150. Each computing device can contain one or more processors 112, memory 114 and other components typically present in general purpose computing devices. Memory 114 of each of computing devices 110, 120, and 130 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored, and modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110, 120, and 130 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of the computing devices as being within the same block, the processor, computer, computing device, or memory can actually comprise multiple processors, computers, computing devices, or memories that may or may not be stored within the same physical housing. For example, the memory 144 can be a hard drive or other storage media located in housings different from that of the computing device 110.

References to a processor, computer, computing device, or memory will be understood to include references to a collection of processors, computers, computing devices, or memories that may or may not operate in parallel. For example, the computing device 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices can be at different nodes of a network 160 and capable of directly and indirectly communicating with other nodes of network 160. Although only a few computing devices 110, 120, and 130 are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120 and 130 via the network. For example, one or more of server computing devices 110 may use network 160 to transmit and present information to a user, such as user 220 or 230, on a display, such as displays 122 or 132 of computing devices 120 or 130. In this regard, computing devices 120 and 130 may be considered client computing devices, and may perform all or some of the features described herein.

Each of the client computing devices 120 and 130 may be configured similarly to the server computing devices 110, with one or more processors, memory and instructions as described above. Each client computing device 120 or 130 may be a personal computing device intended for use by a user 220 or 230, and have all of the components normally used in connection with a personal computing device such as a central processing unit (CPU), memory (e.g., RAM and internal hard drives) storing data and instructions, a display such as displays 122 or 132 (e.g., a monitor having a screen, a touch-screen, a projector, a television, or other device that is operable to display information), and user input device 124 (e.g., a mouse, keyboard, touch-screen, or microphone). The client computing device may also include a camera for recording video streams and/or capturing images, speakers, a network interface device, and all of the components used for connecting these elements to one another.

Although the client computing devices 120 and 130 may each comprise a full-sized personal computing device, they may alternatively comprise mobile computing devices capable of wirelessly exchanging data with a server, such as server computing device 110, over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a tablet or laptop computer. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, and 130 (not shown).

Memory 114 and storage system 150 may include one or more databases. In one example, the memory 114 may include a database comprised of a plurality of databases which store public and private data including sources of supplemental data. Such supplemental data may include calendar data, location data, address book data, contact data, mapping data, or any other such data. The supplemental data may be stored in a web browsing history database, a search history database, a maps history database, an address book database, an e-mail archive database, a calendar entries database, etc. For example, the address book database may include personal data corresponding to a user's contacts, such as contact's names, phone numbers, addresses, etc. In some embodiments the databases may be comprised of a number of different databases containing private and/or public data.

The information stored in each of these databases may be associated with specific programs or types of applications, or with overall operation of the computing devices 120 and 130. For instance, the web browsing history and search history databases may be associated with one or more web browsers such as Edge, Safari, Firefox or Chrome web browsers. The maps history database may also be associated with the web browsers or other applications such as Google Earth. The address book and e-mail archive databases may be linked to messaging applications, such as Gmail or Microsoft Outlook. The calendar entries database may similarly be linked to the messaging application or other application such as Google Calendar. While a number of different databases have been identified above, other databases which may contain location-related information may also be employed, such as the database associated with Google Latitude, a tool which lets users share their current location with friends.

Example Methods

Figure 3:
FIG. 3 is an example application interface in accordance with aspects of the disclosure.
Figure 3:
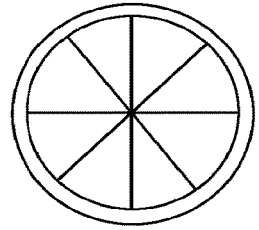
Figure 3:

In order to augment the display of an application with data and user interfaces of other applications a computing device, such as computing device 120 or 130, may load an application. The application may include display elements, such as a user interface, and associated data which is overlaid on the user interface, on the display of the computing device, such as displays 122 or 132. In one example, the application may be a mobile application, such as a restaurant recommendation application, as shown in FIG. 3. The restaurant recommendation application may include a user interface 300 for displaying associated data, such as a list of popular restaurants 320, a title 330, and a subtitle 340.

Figure 4:
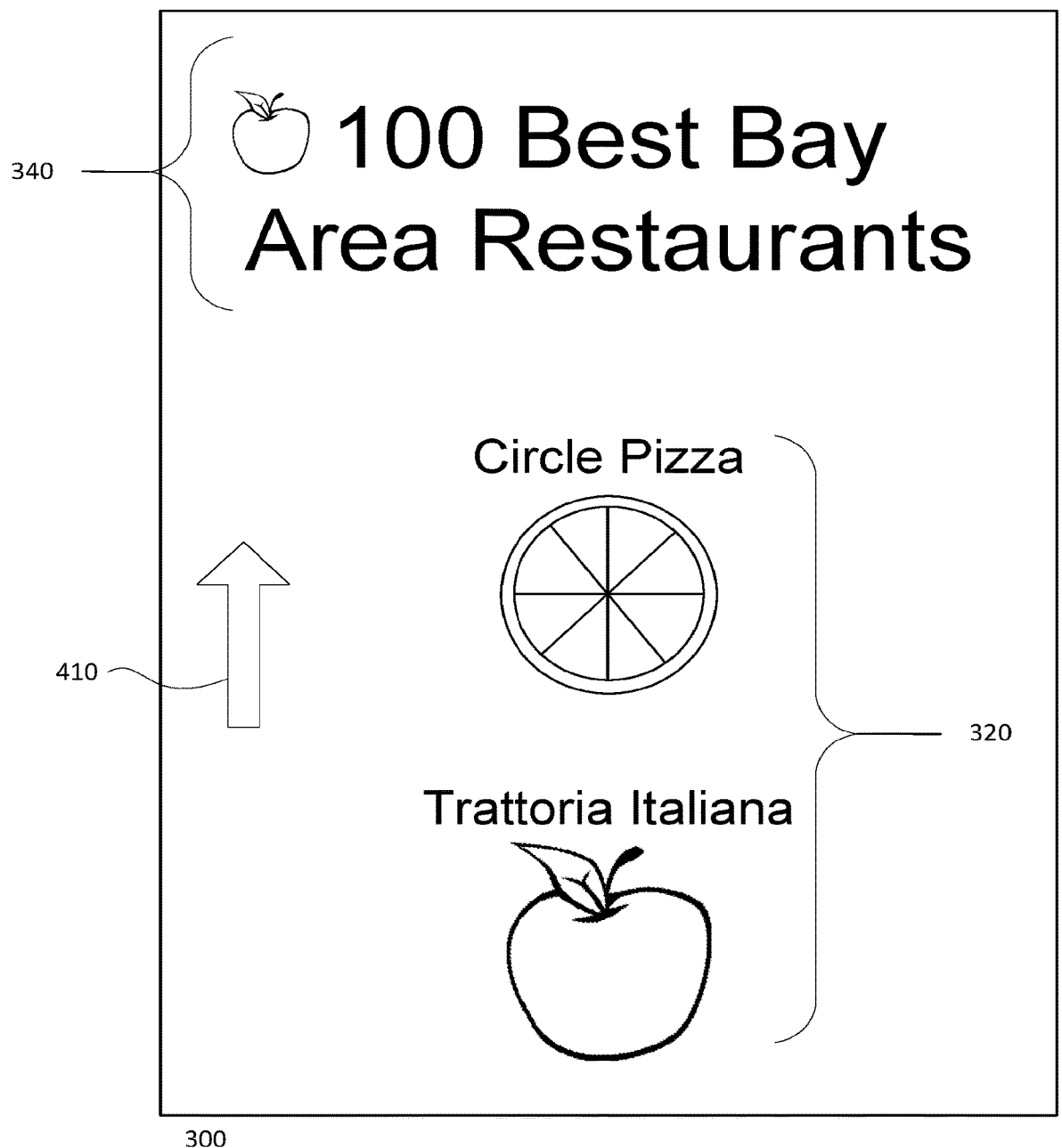
FIG. 4 is another example application interface in accordance with aspects of the disclosure.

A user may interact with the application, such as by scrolling through and selecting associated data from the user interface. For example, as shown in FIG. 4, a user, such as user 220, may swipe the restaurant recommendation application's user interface 300 in a bottom to top motion, as indicated by arrow 410. As such, the title 330 may move off of the display of the computing device, while the subtitle 340 moves upwards. Additional restaurants, in the list of popular restaurants 320, may move onto the screen.

Based on the associated data that is being displayed in the user interface, the application may generate one or more declarations indicating that supplemental data may be accommodated and/or provided by the application. In this regard, the application may generate declarations based on pre-programmed parameters, upon startup of the application, or when the user navigates to a particular portion of the application. Supplemental data may include data which is correlative to the associated data of the application or data which the application indicates is needed. Such supplemental data may include calendar data, location data, address book data, contact data, mapping data, or any other data.

Declarations may include data identifiers. The data identifiers may include input identifiers and/or output identifiers which indicate the specific type of supplemental data which can be accommodated and/or provided, respectively, by the application. The data identifiers may be named such that they are globally unique in accordance with publically available standards or guidelines. In one example, the application may query a list of identifier names which are publically available on a website or database to determine an appropriate name for a data identifier. In some embodiments the names of the data identifiers used by the application may be predetermined based on the associated and supplemental data the application is programmed to manage. In other words, the application may have the names of the data identifiers stored within its code.

The data identifiers may be named such that they include a description of the type of supplemental data each of the data identifier names are associated with, assuring compatibility between the application and other applications. For example, the names of the data identifiers may be based on descriptive terms such that, when any application generates declarations to provide and/or accommodate a specific type of supplemental data, the data identifier associated with these declarations would assure compatibility between the data being provided and/or accommodated. In some embodiments multiple data identifiers may refer to the same type of supplemental data.

Declarations may further include display identifiers. Display identifiers may indicate the types of user interfaces which can be accommodated and/or provided by the application. In this regard, the display identifiers may include display identifiers and compose identifiers which indicate the specific type of user interfaces which can be provided and accommodated, respectively.

As with the data identifiers, display identifiers may be globally unique and named in accordance with publically available standards or guidelines. In one example, the application may query a list of identifier names which are publically available on a website or database to determine an appropriate name for the display identifier. In some embodiments the names of the display identifiers used by the application may be predetermined, and programmed into the applications code. Additionally, multiple display identifiers may refer to the same type of user interface.

The types of user interfaces which may be accommodated and/or provided by the application may be of any shape and size and may further include all types of design elements. In this regard, the types of user interfaces may be of any type, including partial or full-screen user interfaces, as well as user interfaces of a specific size, relative to a display, such as a card. For example, the card user interface may be defined as being rectangular in shape and comprising 25% of the viewable display. Each type of user interface may include user interface elements, such as a user interface layout, interface elements, such as buttons and text, positions of interface elements such, and other such information commonly found in user interfaces.

Figure 5:
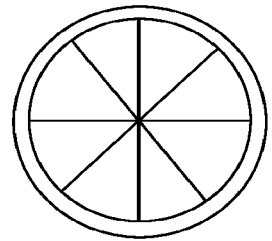
FIG. 5 is a portion of an example application in accordance with aspects of the disclosure.

In one example, upon the user selecting "Circle Pizza," from the list of popular restaurants 320, the restaurant recommendation application may navigate to, and display, the "Circle Pizza" portion 500 of the application. As such, the associated data located within the "Circle Pizza" portion of the application, such as the "Location" 520 and "Hours of Operation" 530, may be displayed by the application on the user interface 300, as shown in FIG. 5.

Upon displaying the associated data of "Location" 520 and "Hours of Operation" 530, two declarations for supplemental data may be generated by the restaurant recommendation application. The two declarations for supplemental data may include a first declaration that includes a first input identifier corresponding to restaurant hours of operation and a second declaration that includes a second input identifier corresponding to the location. Table A shows the contents of the first and second declarations:

Table A
First Declaration:
   a. Input Identifier: Reservation
   b. Output Identifier: Restaurant
   c. Compose: Card
Second Declaration:
   a. Input Identifier: Location
   b. Output Identifier: Address
   c. Compose: Card and Full-Screen Other applications may also generate declarations indicating the specific type of supplemental data which can be accommodated and provided, as described herein. For example, as shown in Table B, two other applications, a reservation application and a directions application operating, or present, on the computing device may generate the following declarations.

Table B:
Reservation Application Declaration:
   a. Input Identifier: Restaurant
   b. Output Identifier: Reservation
   c. Display: Card
Directions Application Declaration:
   a. Input Identifier: Address
   b. Output Identifier: Location
   c. Display: Full-Screen A data management application may monitor the applications on the computing device to determine whether any of the one or more declarations may be satisfied. In this regard, the data management application may be integrated into an operating system executing on the computing device and may continually monitor the applications to determine whether any declarations have been generated. For example, the data management application may monitor the restaurant recommendation application and determine that the first and second declarations were generated.

Upon determining that one or more declarations have been generated, the data management application may extract the data and display identifiers associated with each declaration. For example, the data management application may extract the "Reservation" and "Location" input identifiers from the first and second declarations, respectively, as well as the "Restaurant" and "Address" output identifiers. Additionally, the data management application may extract the corresponding "card" and "card and full-screen" display identifiers.

Based on the extracted data and display identifiers, the data management application may query each of the other applications on the computing device to determine whether they can satisfy the declarations with supplemental data of the specific type identified by the extracted identifiers. In some embodiments, the data management application may monitor external applications or sources of information, such as web-based applications or websites to determine whether these sources have generated any declarations. Such external applications or sources of information may be on a server, such as server 110.

Declarations are satisfied when the data and display identifiers of declarations from the application are matched with the data and display identifiers of at least one of the other applications. In this regard, the input, output, and display identifiers of one declaration should match the output, input, and display identifiers of a second declaration. In some embodiments, declarations may only include an input or output identifiers along with a display identifier. As such, the data management application may only determine whether the provided identifiers may be matched. In some embodiments, declarations may be satisfied when the output and display identifiers are matched with the input and display identifiers of a second declaration.

For example, the first declaration may be compared to the reservation application declaration and directions application declaration by the data management application. In this regard, the data management application may compare each of the extracted input, output, and display identifiers of the first declaration, as shown in Table A, to the extracted output, input, and display identifiers of the reservation and directions applications declarations, as shown in Table B. As the extracted input, output, and compose identifiers of the first declaration match the extracted output, input, and display identifiers of the reservation application declaration, the first declaration may be satisfied by the reservation application declaration. Conversely, as the extracted identifiers of the first declaration fail to match the extracted identifiers of the directions application declaration, the data management may determine that the first declaration is not satisfied by the directions application declaration.

In another example, the data management application may compare each of the extracted, output and display identifiers of the first declaration, as shown in Table A, to the extracted output and display identifiers of the reservation and directions applications declarations, as shown in Table B. As the extracted output and compose identifiers of the first declaration match the extracted input and display identifiers of the reservation application declaration, the first declaration may be satisfied by the reservation application declaration.

The data management application may then compare the second declaration, as shown in Table A, to the reservation application declaration and directions application declaration, as shown in Table B. In this regard, the data management application may determine that the directions application declaration satisfies the second declaration. Additionally, the data management application may determine that the reservation application declaration does not satisfy the second declaration.

In some embodiments the data management application may intermittently query each of the other applications, as well as the application, for declarations and the specific types of identifiers contained within the declarations to determine the types of supplemental data which the applications are capable of accommodating and/or providing. In this regard, the data management application may maintain a database of all of the declarations in association with the specific types of supplemental data and/or identifiers which the respective applications are capable of accommodating and/or providing. As such, the data management application may determine whether a declaration generated by a first application may be satisfied by querying the database, without querying each of the other applications.

Upon determining that at least one the declarations is satisfied, one or more respective notifications indicating that matching supplemental data is available may be provided. The one or more notifications may be displayed on the device and may include selectable banners, pop-up notifications, partial or full-screen overlays, or other such notifications alerting the user that matching supplemental data is available from another application.

Figure 6:
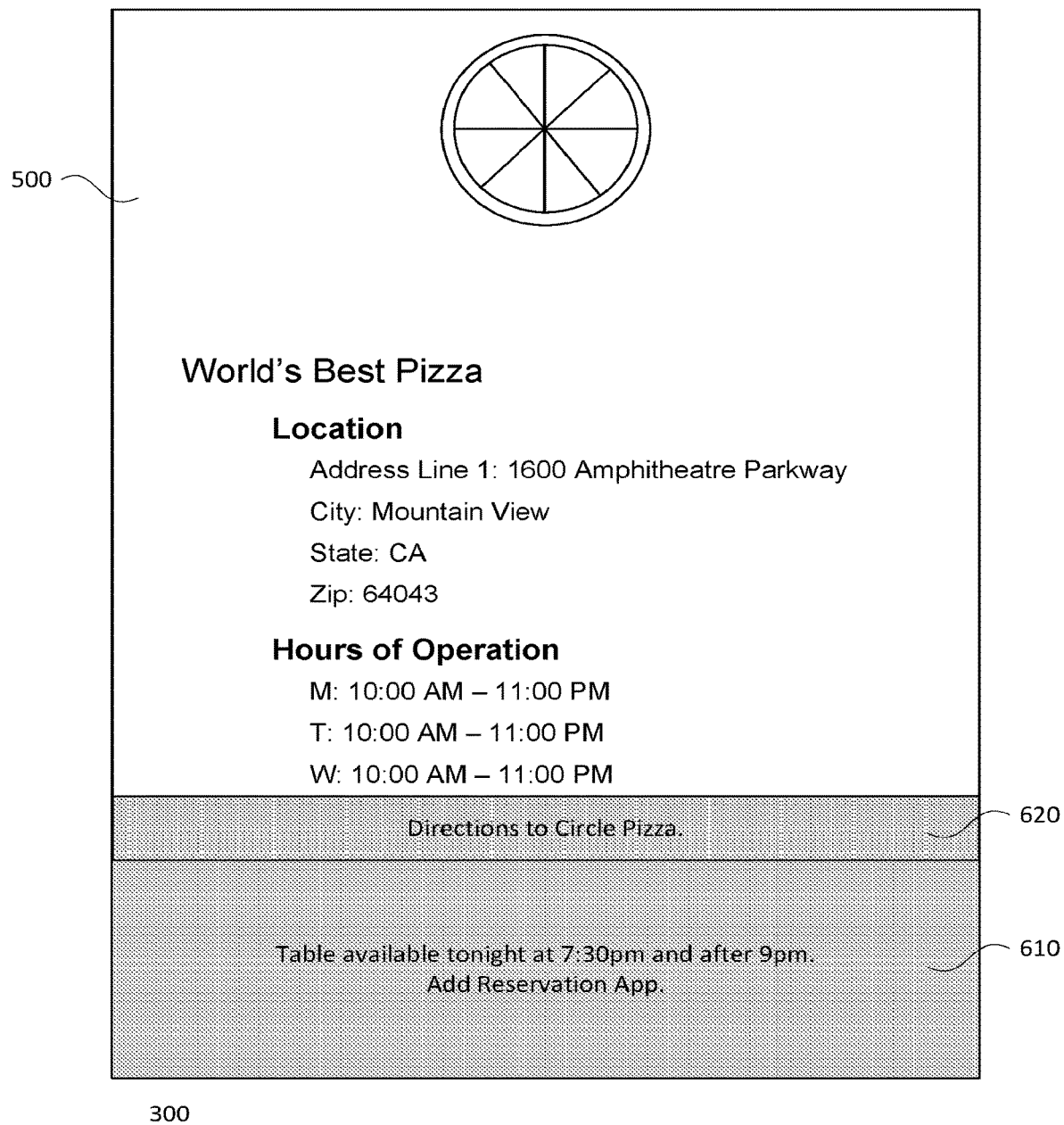
FIG. 6 shows notifications overlaid on a portion of an example application interface in accordance with aspects of the disclosure.

For example, as shown in FIG. 6 banner notifications 610 and 620, indicating that the matching supplemental data, including reservations for Circle Pizza and directions to Circle Pizza, are available may be overlaid on the bottom of the user interface 300 of the application. The notifications may display an overview (i.e., summary) of the matching supplemental data associated with each notification 610 and 620. In some embodiments, name data indicating the other application which is providing the matching supplemental data associated with the respective notification may be displayed.

The notifications may be presented in a space saving arrangement by compressing and placing them behind a first notification. The compressed second notification may only include a summary of the second supplemental data, and may provide the name of the second other application which is providing the second supplemental data to save space on the display. Such an arrangement may allow for notifications to be presented without overtaking the display of the application. For example, as shown in FIG. 6, banner notification 620 may be compressed behind banner notification 610 on the bottom of the display. As such, the banner notification 610 may be considered the first notification.

Upon receiving a selection of one of the notifications, the data management application may integrate the user interface and supplemental data of the other application associated with the selected notification into the user interface of the application. For example, when the user selects banner notification 610, the reservation application may receive a request to provide the user interface and supplemental data associated with the reservation application declaration, as shown in Table B. In some embodiments the application may directly request the supplemental data and user interface from the other application associated with the selected notification.

Figure 7:
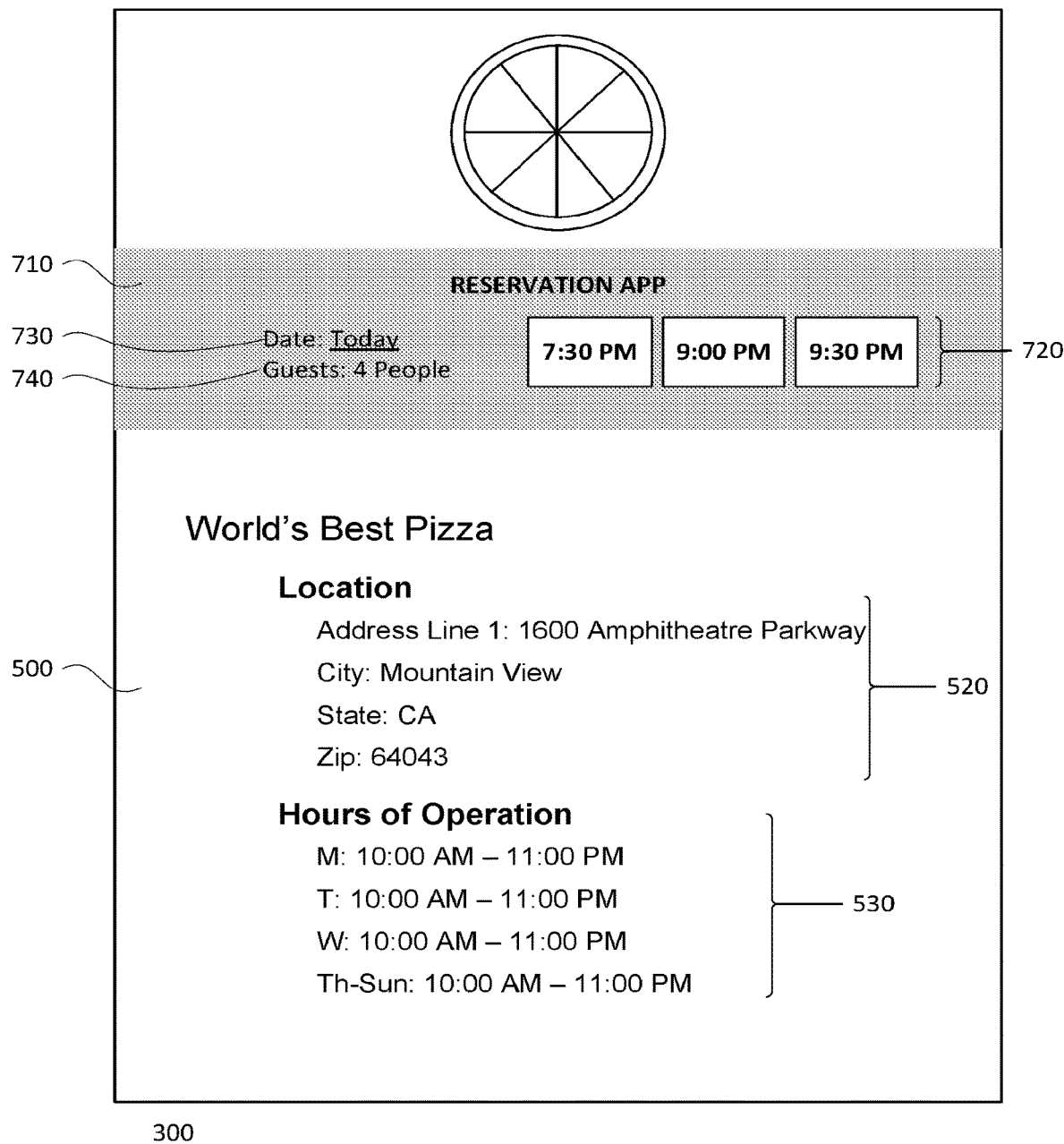
FIG. 7 shows another application integrated into an example application in accordance with aspects of the disclosure.

The data management may integrate the selected other application into the user interface by arranging the supplemental data and user interface provided by the other application into the application. For example, the data management application may receive and forward the supplemental data and user interface provided by the reservation application associated with the selected notification to the restaurant recommendation application. As shown in FIG. 7, the user interface 300 of the restaurant recommendation application may integrate the reservation application 710 by composing the user interface provided by the reservation application along with the corresponding supplemental data 720-740 within its own user interface, in the form of a card. The corresponding supplemental data may include reservation times 720, the date the reservation is being requested 730, and the number of guests for the reservation 740. Additional (or less) corresponding supplemental data may also be displayed by the reservation application 710.

Additional declarations may be generated by other applications which are integrated into the user interface of the application. In this regard, the other applications may generate declarations for additional supplemental data based on the associated data and supplemental data displayed in the user interface. For example, the reservation application 710 may monitor the associated data 520 and 530 and supplemental data 720-740 being displayed by the computing device, and generate one or more declarations for additional supplemental data based on the displayed data.

The data management application may monitor the application and the other applications to determine whether any of the declarations for additional supplemental data may be satisfied, as previously described. In this regard, the data management application may periodically query each of the other applications to determine whether they can provide additional supplemental data of the specific type of data specified in the one or more requests for additional supplemental data.

Figure 8:
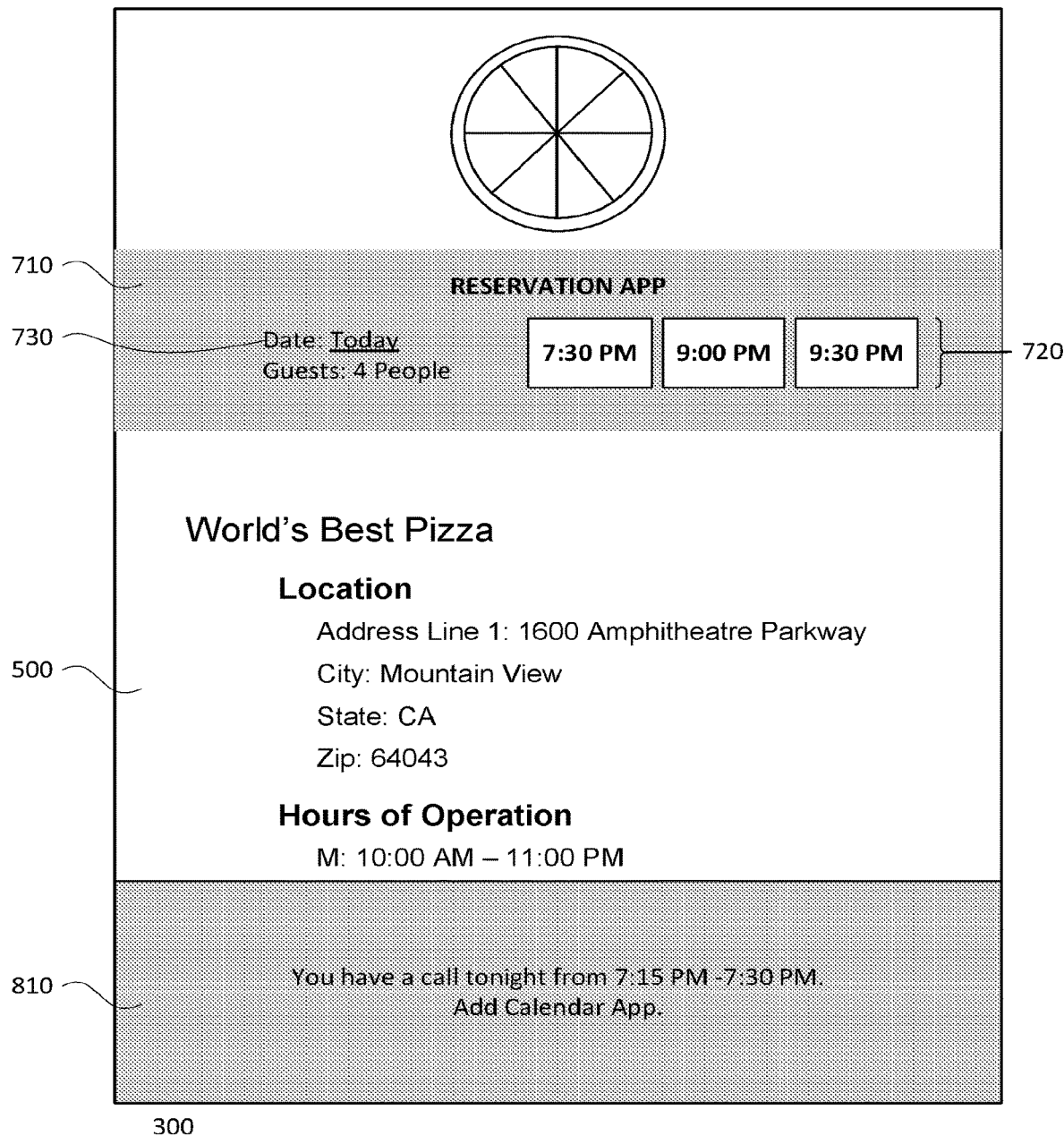
FIG. 8 shows another notification overlaid on a portion of an example application interface in accordance with aspects of the disclosure.

Upon determining that at least one the declarations for additional supplemental data is satisfied, one or more respective notifications indicating that matching supplemental data is available may be provided. For example, as shown in FIG. 8, a second notification 810, indicating that additional supplemental data relating to a scheduled calendar appointment occurring during a potential reservation time as indicated by the supplemental data 720 and 730 of the reservation application 710, may be displayed on the user interface 300 of the restaurant recommendation application.

Figure 9:
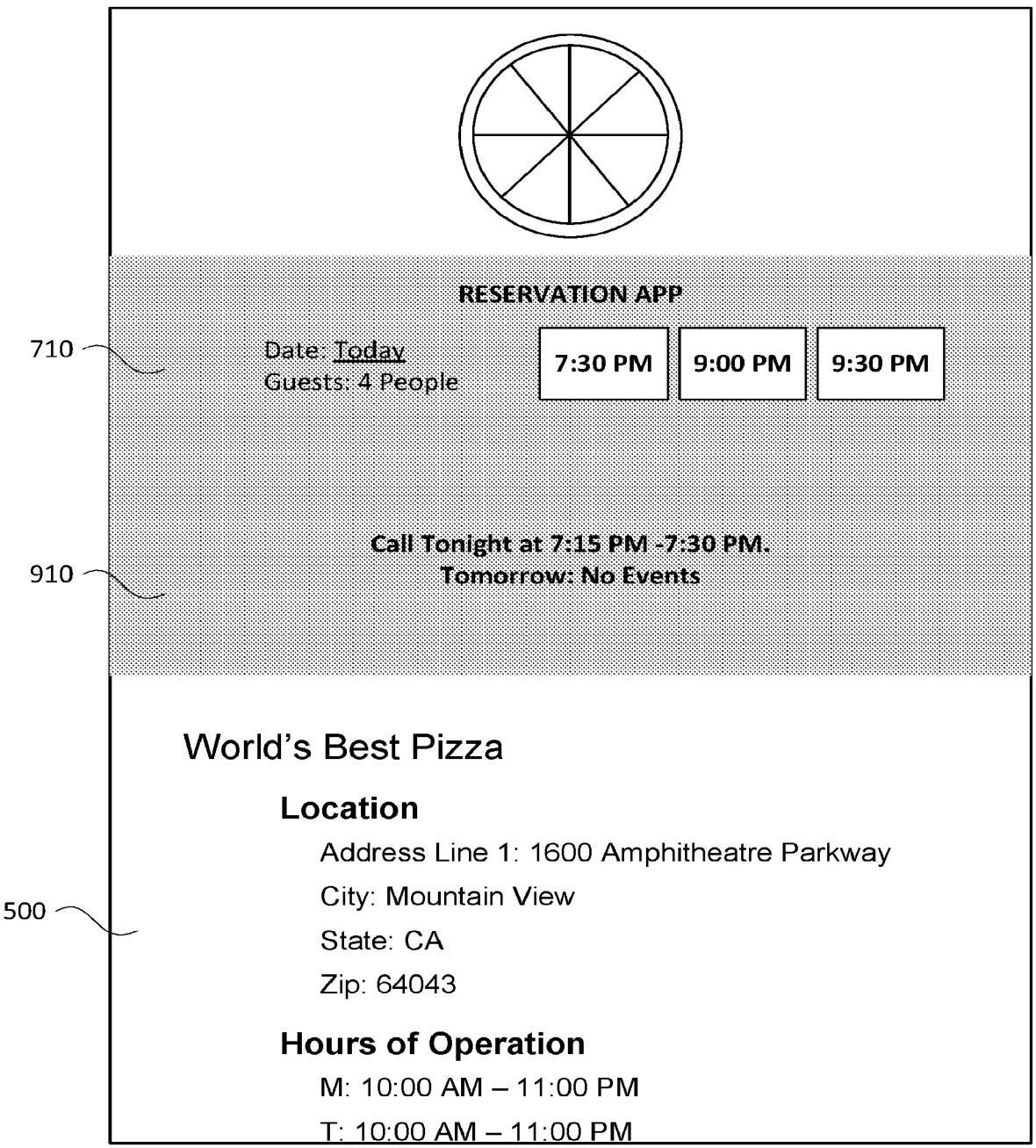
FIG. 9 shows multiple applications integrated into an example application in accordance with an embodiment.

Upon selecting the second notification, the data management module may integrate the other application associated with the second notification into the user interface by arranging the additional supplemental data and corresponding display elements in the location provided by the application. For example, as shown in FIG. 9, a calendar application 910 may be integrated as a second card within the restaurant recommendation application's user interface 300. As such, the user interface of the application 300, including the "Circle Pizza" portion 500 of the application, the reservation application 710, and the calendar application 910 may be integrated into a single display.

Figure 10:
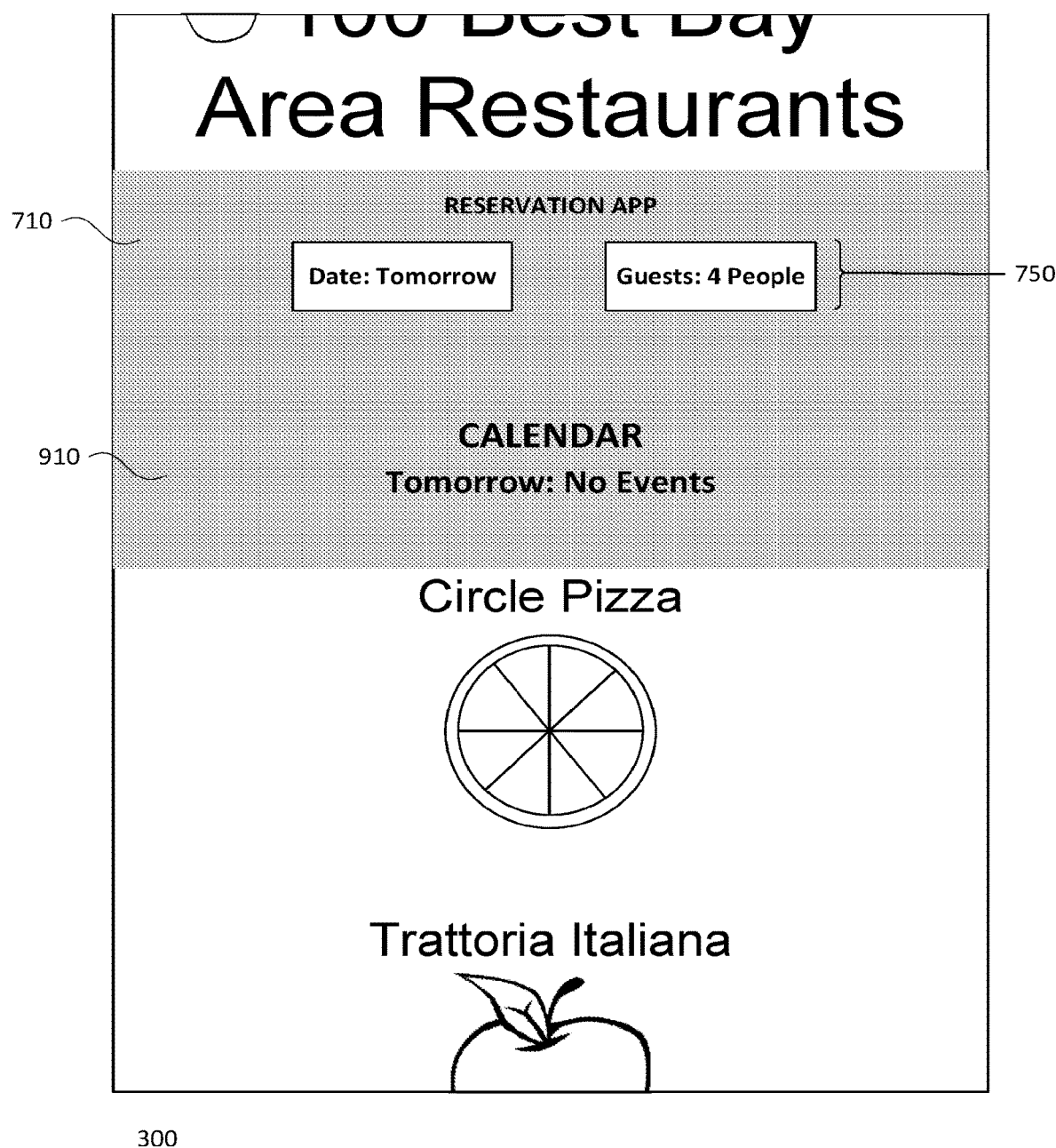
FIG. 10 shows changing supplemental data of multiple applications integrated into an example application in accordance with an embodiment.

The other applications integrated into the user interface may update their corresponding display elements and supplemental associated data based on the data being displayed in the user interface. For example, as shown in FIG. 10, upon the user navigating from a first location in the restaurant recommendation application corresponding to Circle Pizza, to a second location corresponding to an overview page, the data provided by the other applications may change. In this regard, as the associated data no longer includes a restaurant selection, the reservation application may default to generic supplemental data 750, including a date of "tomorrow" and a default number of guests "4 People." Additionally the calendar application 910 may respond to the change of supplemental data within the reservation application, and display the calendar for "tomorrow." In some embodiments the integration of the other applications may be removed when the identifier's of the declaration of which the other application satisfied are no longer matched.

In some embodiments declarations may be satisfied when the data and display identifiers of declarations from the application are matched with the data and display identifiers of two or more other applications. In this regard, one or a group of other application may provide the supplemental data to a second other application. The second other application may then integrate its user interface into the application and display the supplemental data provided by the one or group of other applications.

The features described above may allow for user interfaces of multiple applications to be shown together, to provide a coherent and rich user experience. By displaying multiple user interfaces together in a single display, users are able to utilize multiple applications at a single time without having to navigate between different screens. In addition the features described above may allow for the computing device to anticipate a user's needs, thereby providing information to the user before it is requested.

Figure 11:
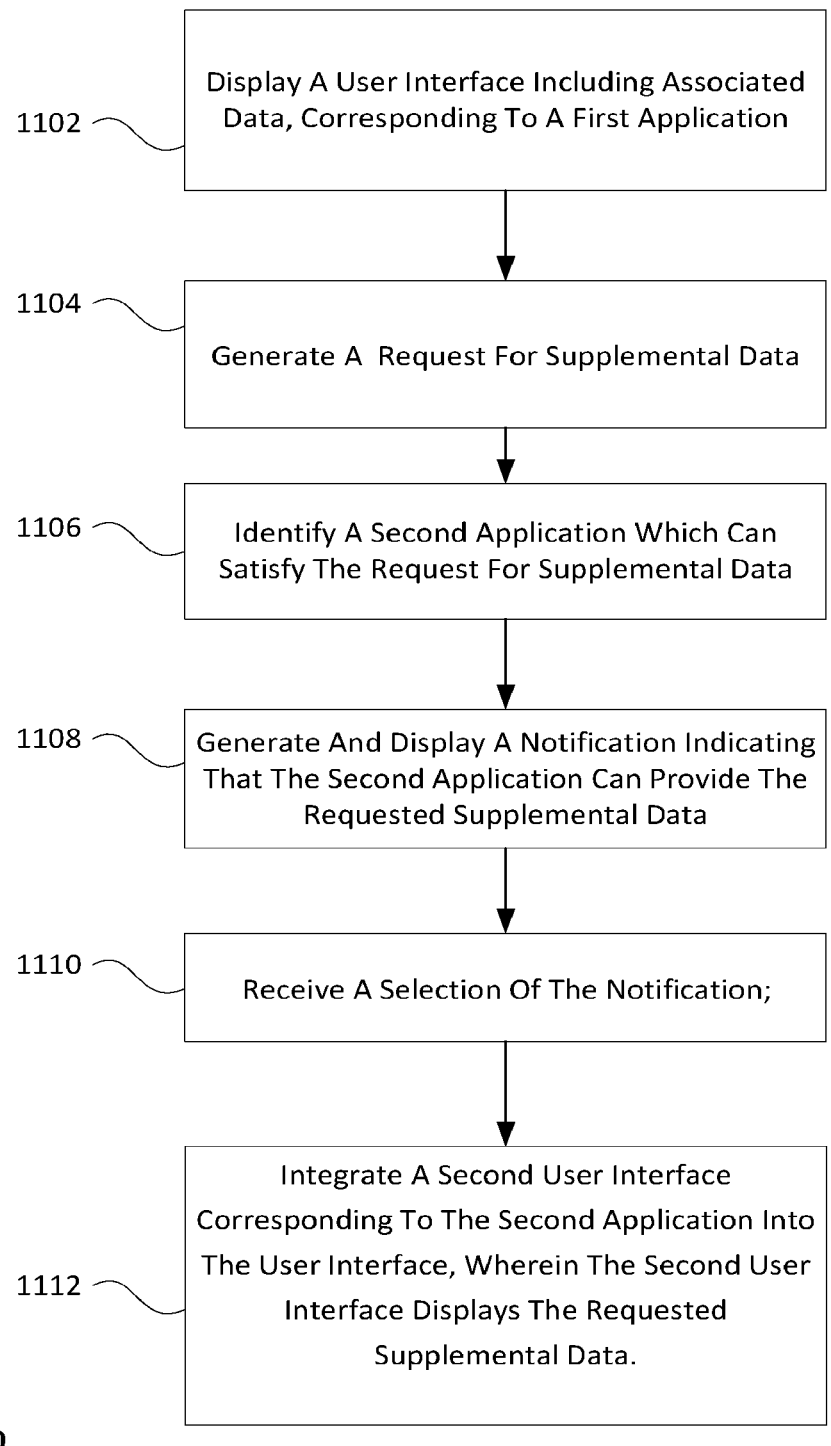
FIG. 11 is a flow diagram in accordance with an embodiment.

Flow diagram 1100 of FIG. 11 is an example flow diagram of some of the aspects described above that may be performed by one or more computing devices such as client computing devices 120 or 130. It will be understood that the steps discussed herein are merely an example; the steps may occur in a different order, steps may be added, and steps may be omitted. In this example, at block 901, one or more computing devices may display a user interface including associated data corresponding to a first application. The one or more computing devices may generate a request for supplemental data, as shown at block 1104, and identify a second application which can satisfy the request for supplemental data as shown at block 1106. The one or more computing devices may generate and display a notification indicating that the second application can provide the requested supplemental data, as shown in block 1108. A selection of the notification may be received by the one or more computing devices, as shown at block 1110, and a second user interface corresponding to the second application may be integrated into the user interface, wherein the second user interface displays the requested supplemental data, as shown in block 1112.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method implemented by one or more processors, the method comprising:
receiving, from a first application, a declaration indicating that supplemental data can be accommodated by the first application;
extracting data identifiers and display identifiers from the declaration received from the first application, data identifiers and display identifiers, wherein each of the data identifiers, extracted from the declaration received from the first application, indicates a corresponding type of supplemental data that can be accommodated by the first application, and each of the display identifiers indicates a corresponding type of user interface that can be accommodated by the first application;
determining, based on the type of supplemental data corresponding to the extracted data identifiers and the type of user interface that can be accommodated by the first application corresponding to the extracted display identifiers, that a second application, of the plurality of applications available on the computing device that can provide the supplemental data, can satisfy the declaration received from the first application;
in response to identifying determining that the second application can satisfy the declaration received from the first application:
causing a user interface to be rendered, in the first application, that includes a first interface portion for the first application and a notification portion that includes a notification indicating that supplemental data is available from the second application;
receiving an affirmative selection of the notification; and
in response to receiving the affirmative selection of the notification:
causing the user interface to be updated to display the first interface portion and at least a portion of the supplemental data, of the second application, in a second interface portion of the user interface rendered in the first application, wherein the second interface portion is of a type corresponding to one of the display identifiers, and wherein causing the user interface to be updated includes causing the second interface portion to be rendered in the user interface in lieu of rendering the notification portion.

2. The method of claim 1, further comprising:
receiving, from the first application, a second declaration indicating that second supplemental data can be accommodated by the first application;
extracting second data identifiers and second display identifiers from the second declaration;
identifying, based on the second extracted data identifiers and second display identifiers, a third application that can provide the second supplemental data; and
in response to identifying the third application:
causing the user interface to be updated to include a second notification portion indicating that the second supplemental data is available from the third application.

3. The method of claim 2, further comprising:
receiving a selection of the second notification; and
causing the user interface to be updated to display, based on the second display identifiers, at least a portion of the second supplemental data in a third interface portion corresponding to the third application, wherein the third interface portion is a type corresponding to one of the display identifiers.

4. The method of claim 1, wherein at least a portion of the supplemental data is not available directly to the first application.

5. The method of claim 1, further comprising:
monitoring each of a plurality of applications, including the first application, for any corresponding declaration, wherein receiving the declaration occurs during the monitoring.

6. The method of claim 1, wherein identifying the second application includes:
generating a request for the supplemental data based on the data identifiers and the display identifiers;
submitting the request to the second application; and
receiving, in response to submitting the request, a confirmation that the second application can satisfy the request.

7. A device comprising:
one or more Wi-Fi network interfaces;
one or more processors; and memory storing instructions that, when executed, cause one or more of the processors to:
receive, from a first application, a declaration indicating that supplemental data can be accommodated by the first application;
extract from the declaration received from the first application, data identifiers and display identifiers, wherein each of the data identifiers, extracted from the declaration received from the first application, indicates a corresponding type of supplemental data that can be accommodated by the first application, and each of the display identifiers indicates a corresponding type of user interface that can be accommodated by the first application;
determine, based on the type of supplemental data corresponding to the extracted data identifiers and the type of user interface that can be accommodated by the first application corresponding to the extracted display identifiers, a second application, of the plurality of applications available on the computing device, can satisfy the declaration received from the first application;
in response to determining that the second application can satisfy the declaration received from the first application:
cause a user interface to be rendered, in the first application, that includes a first interface portion for the first application and a notification portion that includes a notification indicating that supplemental data is available from the second application;
receive an affirmative selection of the notification; and
in response to receiving the affirmative selection of the notification:
cause the user interface to be updated to display the first interface portion and at least a portion of the supplemental data, of the second application, in a second interface portion of the user interface rendered in the first application, wherein the second interface portion is of a type corresponding to one of the display identifiers, and wherein causing the user interface to be updated includes causing the second interface portion to be rendered in the user interface in lieu of rendering the notification portion.

8. The device of claim 7, wherein the instructions further cause the one or more processors to:
receive, from the first application, a second declaration indicating that second supplemental data can be accommodated by the first application;
extract second data identifiers and second display identifiers from the second declaration;
identify, based on the second extracted data identifiers and second display identifiers, a third application that can provide the second supplemental data; and
in response to identifying the third application:
cause the user interface to be updated to include a second notification portion indicating that the second supplemental data is available from the third application.

9. The device of claim 8, wherein the instructions further cause the one or more processors to:
receive a selection of the second notification; and
cause the user interface to be updated to display, based on the second display identifiers, at least a portion of the second supplemental data in a third interface portion corresponding to the third application, wherein the third interface portion is a type corresponding to one of the display identifiers.

10. The device of claim 7, wherein at least a portion of the supplemental data is not available directly to the first application.

11. The device of claim 7, wherein the instructions further cause the processors to:
monitor each of a plurality of applications, including the first application, for any corresponding declaration, wherein receiving the declaration occurs during the monitoring.

12. The method of claim 7, wherein identifying the second application causes the one or more processors to:
generate a request for the supplemental data based on the data identifiers and the display identifiers;
submit the request to the second application; and
receive, in response to submitting the request, a confirmation that the second application can satisfy the request.

13. A method implemented by one or more processors, the method comprising:
monitoring a plurality of applications to determine whether one or more of the applications can accommodate supplemental data;
receiving, from a first application of the plurality of applications, a request for supplemental data;
extracting from the request received from the first application, data identifiers and display identifiers, wherein each of the data identifiers, extracted from the request received from the first application, indicates a type of supplemental data that can be accommodated by the first application, and each of the display identifiers indicates a corresponding type of user interface that can be accommodated by the first application;
determining, based on the type of supplemental data corresponding to the extracted data identifiers and the type of user interface that can be accommodated by the first application corresponding to the extracted display identifiers, that a second application, of the plurality of applications, can satisfy the request received from the first application;
in response to determining that the second application can satisfy the request received from the first application:
causing the user interface to be updated to display at least a portion of the supplemental data, of the second application, in a second interface portion of the user interface, wherein the second interface portion is of a type indicated by one of the display identifiers, and wherein causing the user interface to be updated includes causing the second interface portion to be rendered in the user interface in lieu of rendering, in the user interface, of a notification indicating that the second application can provide supplemental information.

14. The method of claim 13, further comprising:
providing the notification, via the user interface, indicating that the second application can provide supplemental information; and
receiving confirmatory input indicating selection of the notification.

15. The method of claim 13, wherein the notification includes at least a portion of the supplemental data.

16. The method of claim 13, wherein at least a portion of the supplemental data is not available through the first application.

* * * * *